Sept. 13, 1927.

R. R. JONES 1,642,614

METHOD OF CURING RUBBER ARTICLES

Filed April 16, 1923

Witness:

Inventor:
Robert R. Jones

Patented Sept. 13, 1927.

1,642,614

UNITED STATES PATENT OFFICE.

ROBERT R. JONES, OF AKRON, OHIO.

METHOD OF CURING RUBBER ARTICLES.

Application filed April 16, 1923. Serial No. 632,278.

This invention relates to the manufacture of rubber articles and is herein illustrated in its application to the curing of pneumatic tires. It will be recognized, however, that in many of its aspects the invention is not limited to the manufacture of articles of that particular type, but is generally applicable to the manufacture of rubber articles of various types.

It has heretofore been difficult from a practical standpoint to cure a pneumatic tire upon a water filled bag on account of the presence of air bubbles within the bag, such bubbles acting as insulators and thereby preventing the heat in the water from penetrating the layers of the tire under the bubbles and resulting in the improper curing of the tire over certain areas, or the production of what is commonly termed "cold spots." Furthermore, the use of water at the ordinary boiling temperature is insufficient to obtain a satisfactory cure.

A general object of the invention is to provide a method of curing tires on water bags which will entirely eliminate the above deficiencies.

In a further aspect the invention provides a novel method whereby the inner layers of the tire will be thoroughly and uniformly cured to the desired extent.

These and other features of the invention and the novel method referred to, will appear more fully from the following detailed description, when read in connection with the accompanying drawings, and will be pointed out in the appended claims.

Figure 3:
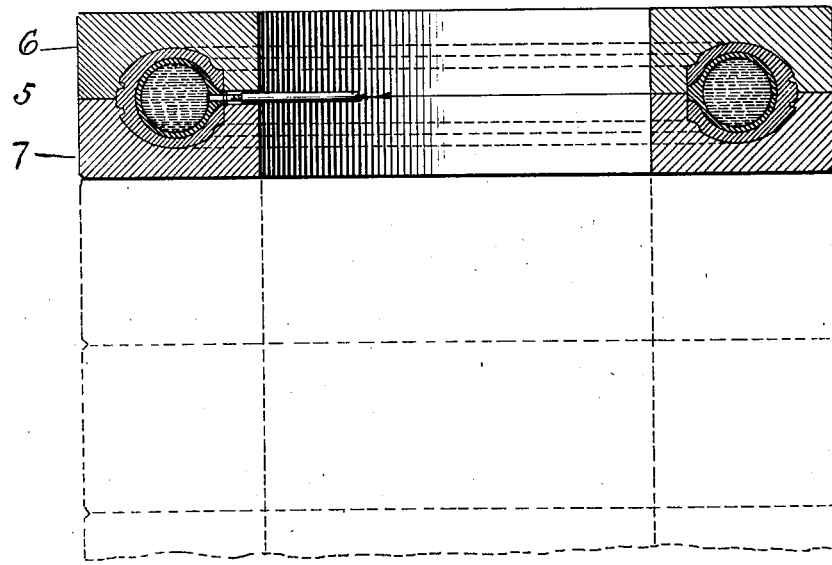
Figure 3 is a cross section of a tire in place in the mold during the curing operation.

In the particular embodiment of my invention selected for illustration herein, the usual tire casing, which is to be subjected to vulcanization, is indicated at 1. A water bag 2 provided with a valve 3 is placed within the casing in the usual manner. A tubing 4 is used to connect the water bag with an exhaust pump (not shown), or with a water supply tank (not shown) at successive stages in the applicant's process. Referring to Figure 3, the conventional split mold 5 composed of upper and lower sections 6 and 7 is shown, within which the tire casing is placed and subjected to heat and pressure in a vulcanizing chamber.

Figure 1:
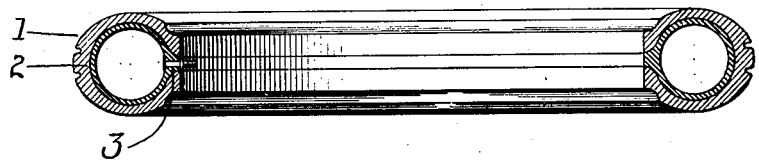
Figure 1 is a vertical cross-section of a tire showing a water bag in place therein.
Figure 2:
Figure 2 is a similar view with the water bag completely exhausted of air.

The water bag being properly positioned, the bag is completely exhausted of air, in the manner illustrated in Figure 2, by connecting the tubing 4 with an exhaust pump. The casing and collapsed bag are then placed within the mold 5 and the halves are secured together. The mold is placed in a vulcanizing chamber where the tire is to be subjected to heat and pressure. At this point the tubing 4 is connected to a water supply, and the bag is filled with hot water, the heat of which is utilzed to cure the inner plies of the tire. The water used for this purpose is heated while under pressure to a temperature of 290° Fahrenheit or above, it having been found that ordinary boiling water is insufficient to obtain an even, uniform cure. The pressure of the water in the bag is maintained at between 200 to 300 pounds. The tire is cured for a predetermined length of time while subject to a specified pressure and temperature, neither the length or amount of which is essential to this invention, but which are varied as the size and composition of the tire may require.

By completely exhausting the air from the water bag prior to the entrance of the hot water, the possibility of having air pockets and bubbles in the former is completely removed. The heat in the water is thus assured of even distribution throughout the entire area of the inner layers of the tire, and as a result a thorough and uniform cure is obtained throughout. Moreover, the absence of the air pockets decreases the length of time necessary for the curing operation as the flow of heat from the water to the inner layers of the tire is not impaired or interrupted.

The operation of my invention will be obvious from the foregoing description, but it is to be understood that the present disclosure is merely illustrative and is not to be construed as restricting the invention unless otherwise indicated in the claims appended hereto.

What I claim is:

1. The improvement in the method of curing a rubber article upon a water bag which consists in completely exhausting the air from the bag and filling the bag with water at a vulcanizing temperature.

2. The method of curing a rubber article which consists in placing a water bag within the article, collapsing the bag by exhausting the air therefrom, and filling the bag with hot water for curing the article.

3. The improvement in the method of curing an article of rubber and fabric upon a water bag which consists in completely exhausting the air from the bag and filling the bag with water under pressure and at a temperature equal to or greater than its normal boiling point.

4. The method of curing a pneumatic tire which consists in placing a water bag within the tire, collapsing the bag by exhausting the air therefrom, placing the tire and collapsed water bag within a mold, filling the bag with water, and subjecting the tire to heat and pressure from the exterior of the tire.

5. The method of vulcanizing tires or the like, comprising placing a core within the tire, evacuating the core, placing the tire and core within a mold, filling the core with water under pressure and at a temperature about the boiling point, and at the same time subjecting the tire to heat and pressure from the exterior.

6. That method of curing rubber articles enclosed in molds with expansible pressure bags which comprises evacuating air from the bags, and, without permitting reentry of air, admitting water to the bags at a temperature greater than its normal boiling point to effect the cure and under pressure to expand the articles against the mold surfaces.

7. That method of curing hollow rubber articles which comprises enclosing the same in molds, introducing into the articles water under pressure to expand the articles against the mold surfaces and at curing temperature greater than its normal boiling point to cure the articles from within, said water being at said temperature when it is introduced into the articles, and supplying a heated fluid curing medium about the molds to simultaneously cure the articles from without and to maintain the water at a curing temperature throughout the period of cure.

8. That method of curing tire casings which comprises inserting expansible pressure bags therein, enclosing the tires in molds, and simultaneously curing the tires from without and from within by supplying a fluid curing medium about the molds and by introducing water into the bags under a pressure to expand the tires against the surfaces of the molds and at a temperature greater than its normal boiling point to effect a cure, said water being at said temperature when introduced into said bags and being maintained at a curing temperature throughout the curing period.

ROBERT R. JONES.